March 26, 1957 L. C. COBBETT 2,786,986
COMPENSATED LISTENING SYSTEMS
Filed Oct. 30, 1948 2 Sheets-Sheet 1

INVENTOR
LEONARD C. COBBETT
By
ATTORNEY

March 26, 1957  L. C. COBBETT  2,786,986
COMPENSATED LISTENING SYSTEMS
Filed Oct. 30, 1948  2 Sheets-Sheet 2
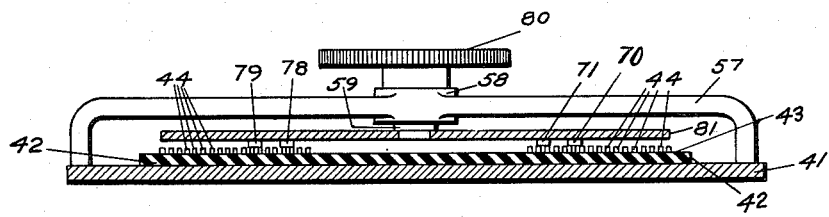
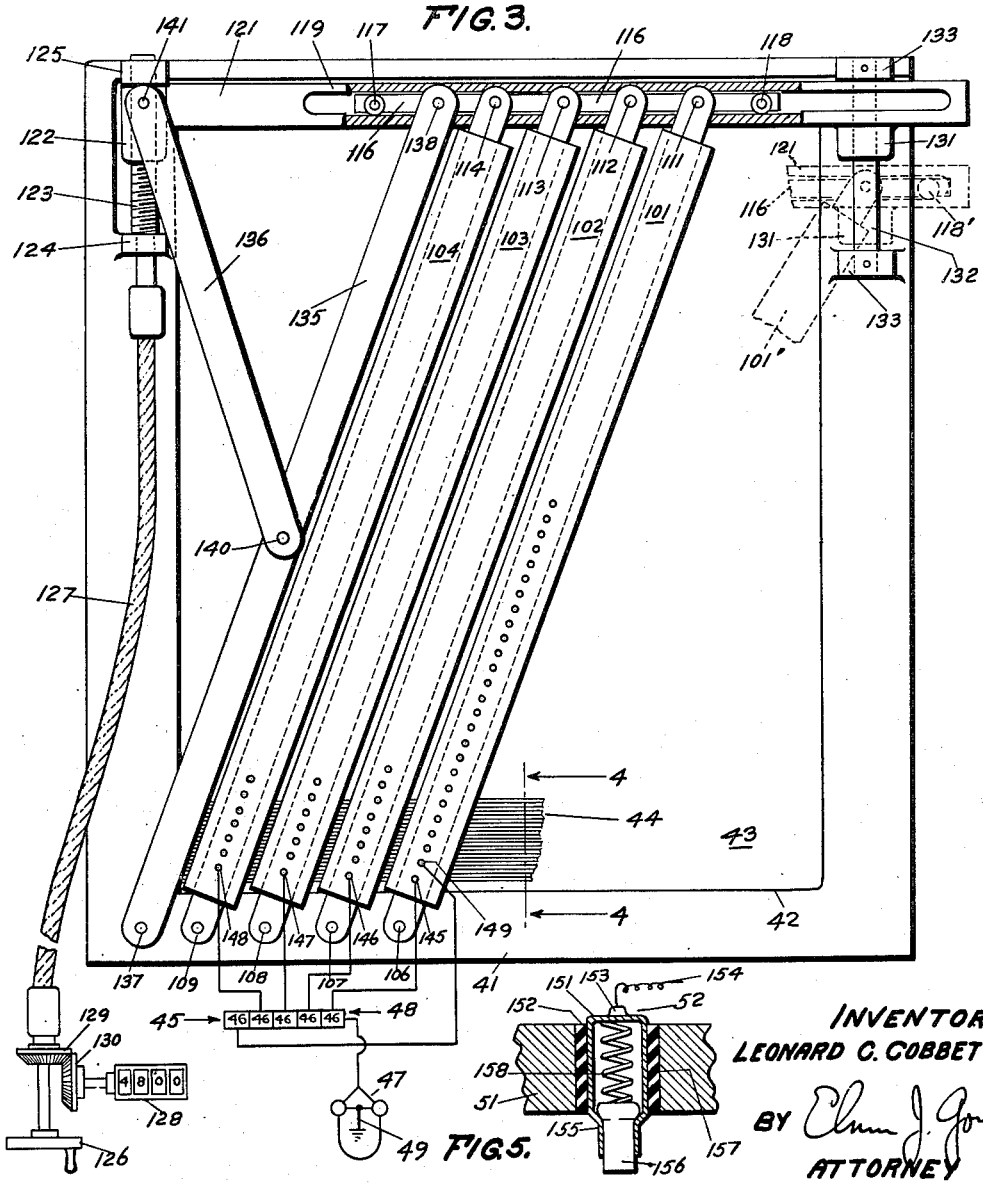
INVENTOR
LEONARD C. COBBETT
BY
ATTORNEY United States Patent Office 2,786,986
Patented Mar. 26, 1957

2,786,986

COMPENSATED LISTENING SYSTEMS

Leonard C. Cobbett, Foxboro, Mass., assignor to Raytheon Manufacturing Company, a corporation of Delaware Application October 30, 1948, Serial No. 57,540

16 Claims. (Cl. 340—6)

This invention relates generally to wave direction determining systems employing a distributed array of wave detectors linked through adjustably compensatable paths to a common indicating means, and in particular to a system wherein the overall system compensation is adjustable to correct for changes in the speed of transmission of the observed waves due to changes in the character of the medium.

It is the general object of the invention to provide a readily adjustable means for changing the effective lengths of the compensation paths in systems of the foregoing kind.

It is a more specific object to provide improved means in an underwater sound direction determining system employing hydrophones in a distributed array to correct for changes in the speed of sound with changes in the temperature and/or salinity of the water.

It is a further object to provide such correcting means which can be adjusted to a fine degree of accuracy, and does not interfere with the normal operation of the remainder of the system.

Another object is to provide such correcting means which is easily understood and serviced, as well as relatively simple and inexpensive to manufacture.

Other and further objects and features of the invention will become apparent from the description of a particular embodiment thereof that follows, reference being had to the accompanying drawings, wherein:

Fig. 2 is an enlarged section along line 2—2 of Fig. 1;

Fig. 3 is a preferred embodiment of the switching mechanism of the invention;

Fig. 5 is an enlarged fragmentary section showing details of commutator brush construction.

Figures 1, 4:
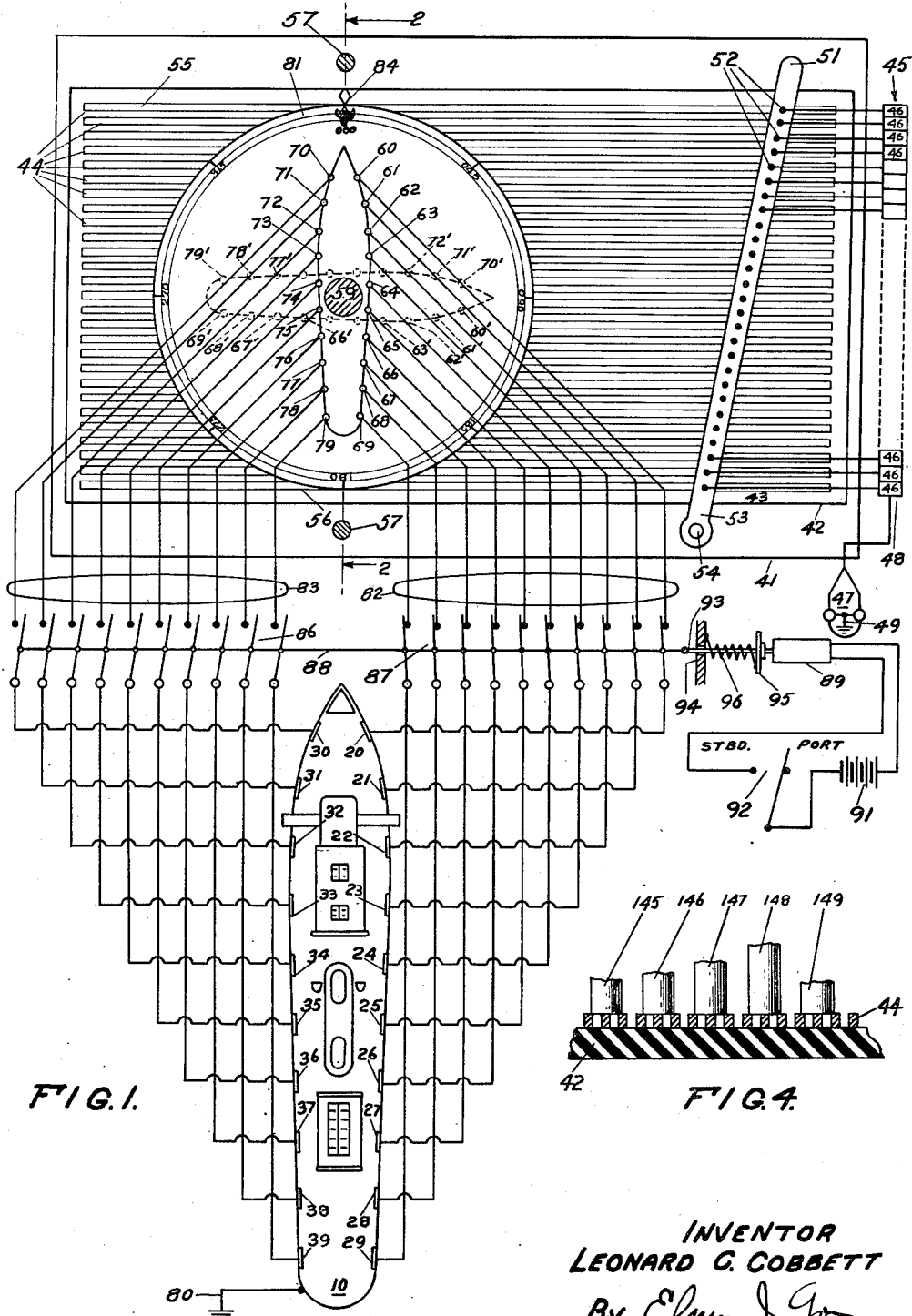
Fig. 1 is a diagrammatic view of the invention, illustrating the use thereof aboard a ship to determine the direction of underwater sounds.
Fig. 4 is an enlarged fragmentary section taken along line 4—4 of Fig. 3.

Referring now to Fig. 1, a ship aboard which the present listening system is installed is generally designed by the reference character 10. The ship is provided with a plurality of individual hydrophones 20 to 39, inclusive, of which one set of 10, namely, hydrophones 20 to 29, inclusive, is installed along the starboard side, and the remainder, 30 to 39, inclusive, are installed along the port side. The hydrophones of each set are distributed along the side of the ship from bow to stern in a generally uniform array. As will be appreciated from the discussion that follows, the number of hydrophones used, as well as the disposition of individual hydrophones about the ship, can be varied as desired that is, the array does not have to be symmetrical. A sound wave arriving through the water at either side of the ship 10 is detected in each of the hydrophones on the side of arrival, being to a great extent blocked from the hydrophones on the other side by the hull. The detecting hydrophones are employed in accordance with the principle of acoustic or electrical compensation to determine the direction of the detected sound.

In the present system, electrical compensation is employed. A rectangular base plate 41, which may be of steel or other rigid metal, supports a second rectangular plate 42 which is made of electrically non-conductive material. The second plate 42 has a plane top surface 43 on which is mounted a plurality of parallel commutator bars 44 covering substantially the entire plane surface. An electrical delay line 45, made up of a series of delay line sections 46, is connected to the commutator bars in such a fashion that there will be an electrical delay from one connected bar to the next. The delay line sections 46 are electrically connected to the commutator bars by means of an arm 51 and a plurality of delay-line commutator brushes 52 carried thereon, one for each delay section 46. The arm 51 is pivotally mounted at its lower end 53 by means of a pivot post 54 on the lower margin of the base plate 41. The operation of the arm 51 will be described in greater detail below. A pair of earphones 47 is connected to the lowermost end 48 of the delay line 45. The earphones 47 are provided with a ground connection at 49.

The signals from the hydrophones 20 to 39, inclusive, are brought to the commutator bars 44 by way of individual hydrophone commutator brushes 60 to 79, respectively, which are mounted in a circular plate or disk 81. The hydrophone brushes 60 to 79, inclusive, are each connected to one of the hydrophones 20 to 39, respectively, the brushes 60 to 69 being connected to the starboard hydrophones 20 to 29, respectively, by means of a first ten-conductor cable 82, and the brushes 70 to 79, inclusive, being connected to the port hydrophones 30 to 39, inclusive, by means of a second ten-conductor cable 83. As is shown in Fig. 1, the brushes 60 to 79, inclusive, are arranged in a pattern which is an exact duplicate in miniature of the pattern in which the hydrophones 20 to 39, inclusive, are arranged in the ship 10. As is shown in Fig. 2, the disk 81 is supported adjacent the commutator bars 44 in a plane parallel to that of the surface 43 by means of a two-legged support 57 which straddles the bars 44 and is supported on the base 41. The disk 81 is pivotally mounted at its center in the support 57 by means of a collar 58 and shaft 59 on the support and disk, respectively. A handwheel 80 is provided to turn the disk 81. The details of the support 57 and handwheel 80 have been omitted from Fig. 1 to avoid confusion. The hydrophone brushes 60 to 79, inclusive, bear lightly but firmly on the commutator bars 44 in a direction normal to the surface 43. An indicator 84 provides a reference mark against which a calibrated bearing scale around the periphery of the disk 81 may be read.

The ship 10 is provided with a ground connection at 80. The circuit of each hydrophone 20 to 39, inclusive, is completed through the appropriate hydrophone brushes 60 to 79, respectively, the commutator bars 44, delay line brushes 52 and delay line 45, earphones 47, and ground connections 49 and 80. It will be appreciated that, in the actual installation, the ground connections 49 and 80 are made within the ship 10.

As has been already set forth, when a sound is being detected on one side of the ship 10, the hydrophones on the other side are to a greater extent blocked by the hull of the ship. However, the various hydrophones may introduce voltages due to various sources of noise not related to the detected sound. It is, therefore, advantageous to employ switches 86 and 87 in the cables 82 and 83, respectively, to enable the hydrophones from one side or the other of the ship to be cut out of the listening circuit. Each of the switches 86 and 87 is a ten-pole single throw switch, each pole being used for one wire of the cable wherein the switch is installed, and the two switches are desirably linked together by a common shaft 88 which is operated by a solenoid 89. When the shaft 88 is pulled to the right in Fig. 1, switch 87 is closed and switch 86 is opened, while switch 87 is opened and switch 86 is closed when the shaft is moved to the left. A battery 91 furnishes current to operate the solenoid 89, under the control of a port-starboard switch 92. When the solenoid is energized, the shaft 88 is pulled to the right and the starboard hydrophones are in use. This occurs when the switch 92 is closed, and is, therefore, in the starboard position as shown in the drawing. The solenoid 89 is linked to the shaft 88 by a solenoid shaft 93 which runs in a fixed bearing 94. Between the bearing 94 and the solenoid, a collar 95 is affixed to the solenoid shaft 93. A spring 96 is disposed about the solenoid shaft 93 and fastened at one end to the bearing 94 and at the other end to the collar 95. When the solenoid 89 is actuated, the spring 96 is placed under tension so that when the switch 92 is opened, or placed in the port position, the spring 96 moves the shaft 88 to the left, opening the starboard switch 87 and closing the port switch 86, so that the port hydrophones are in use.

Consider now a sound arriving on the port beam, that is, directly on the left-hand side of the ship 10, remembering that for all practical purposes the sound has a plane wave front. This sound will arrive first at port hydrophone 32, and last at port hydrophone 30, as is apparent in Fig. 1. In the array of commutator bars 44, the bar 55 nearest the top of the figure is separated from the earphones 47 by the greatest number of delay line sections 46, while the bar 56 nearest the bottom is separated from the earphones 47 by the minimum number of delay line sections. The commutator bars intermediate bars 55 and 56 are at progressively greater electrical distances from the earphones from the bottom bar 56 to the top bar 55. Thus, if the disk 81 is turned in a clockwise direction until scale number 270 is opposite the index 84, the port hydrophone commutator brush 72, connected to hydrophone 32, will be the greatest electrical length from the earphones 47, as shown at 72', while brush 70 from hydrophone 30 will be the minimum electrical length from the earphones, as shown at 70'. The delay line 45 is so designed that the port hydrophone brushes 70 to 79, inclusive, occupying positions 70' to 79', respectively, will be separated by electrical distances which correspond, respectively, to the acoustic distance between hydrophones 30 to 39, inclusive, in a direction perpendicular to the front of the detected sound wave arriving on the port beam. As a result, the signals provided from each of the port hydrophones will all be in the same phase at the earphones 47, and the detected sound will be heard with maximum intensity. What has happened is that, by turning the disk 81 until the replica of the hydrophone array that appears thereon assumes the same attitude toward a line running across the bars 44 from the bar 55 of highest delay to the bar 56 of smallest delay as the attitude of the ship 10 toward the direction of the detected sound, the sounds arriving in the various hydrophones are brought into phase and the direction from which the sound arrives is directly indicated by the scale of the disk 81 and the indicator 84. It is therefore apparent that, in this system when the sound in the earphones 47 is at a maximum, the detected sound wave may always be considered as approaching in a direction transverse to the commutator bars 44. From another point of view, the commutator bars 44 are analogous to a progressive plane wave front in the water in which the ship 10 is borne, in that they are separated from each other by electrical time delays corresponding to the acoustic time delays in water paths of predetermined lengths.

As is well known, the temperature and salinity of ocean water have a noticeable effect upon the speed of sound through the water. For example, where in one region at a given time of the year the speed of sound through ocean water may be 4800 feet per second, in another region, or at another time of the year, the speed of sound may be 4900 feet per second through ocean water. It is therefore advantageous to be able to vary the number of sections 46 of the delay line 45 that are connected between adjacent commutator bars 44, in order to compensate the system for changes in the speed of sound. The pivotally-mounted arm 51 provides such compensation. This arm is adjusted about the pivot 54 in accordance with the speed of sound through the water so that the electrical delay from one connected commutator bar to the next corresponds more accurately to the actual speed for the region and time of the year. An operator of the equipment need only refer to known temperature and salinity charts and set the arm 51 in accordance with a calibrated scale or indicating device, for example, as shown in Fig. 3, to attain the greatest operational accuracy within the system. In Fig. 1 the delay-line brushes 52 are closely spaced but far enough apart so that in no operating position of the arm 51 can a commutator bar 44 short-circuit a line section 46. The hydrophone brushes 60 to 79, inclusive, have diameters of the order of the width of two or more commutator bars 44, as is apparent in Fig. 2. With this arrangement, no hydrophone 20 to 39, inclusive, is ever disconnected from the delay line 45.

It is desired that the change in effective electrical delay between successive commutator bars 44 when the arm 51 is moved about its pivot 54 shall be smooth and uniform, as well as that at no time shall any hydrophone be disconnected from the delay line 45. In a practical construction the commutator bars 44 may be so finely constructed that there will be fifty or more bars to an inch. It will be appreciated that with even the smallest delay-line brushes 52 the problem of spacing and arranging the brushes sufficiently closely in the arm 51 for smooth commutation and correct compensation at the same time is a great one. The arrangement illustrated in Fig. 3 effectively solves this problem.

In Fig. 3 there are four velocity compensation arms 101, 102, 103 and 104. These arms are arranged parallel to each other, being pivoted at their lower ends about pivots 106, 107, 108 and 109, respectively, and at their upper ends about pivots 111, 112, 113 and 114, respectively. The lower pivots 106 to 109, inclusive, are arranged in a straight line and fixed in the lower margin of the base 41. The upper pivots 111 to 114, inclusive, are arranged in a second straight line parallel to that of the lower pivots and fixed in a movable slide rod 116. The slide rod 116 is provided with bearings 117 and 118 at either end. The bearings 117 and 118 run in a raceway 119 which is contained in a bar 121. The bar 121 is disposed in a direction parallel to the lines of the pivots and mounted for motion in a direction transversely thereto to and from the lower pivots 106 to 109, inclusive. The left-hand end of the bar 121 is provided with a threaded socket 122 through which is threaded a lead screw 123. The lead screw is in turn journaled at its ends into supports 124 and 125 which are fixedly mounted on the base 41, at the upper left-hand corner thereof. The lead screw is turned by a remotely located hand-wheel 126 by way of a flexible shaft 127. A counting device 128 is geared to the hand wheel 126 by way of suitable gears 129 and 130, for a purpose which will be explained below. The right-hand end of the bar 121 is provided with a collar 131 which rides on a shaft 132 disposed at the upper right-hand corner of the base 41 parallel to the lead screw 123. The shaft 132 is fixedly mounted at its ends on the base 41 by means of two supports 133. When the lead screw 123 is turned, the bar 121 moves on the screw and on the shaft 132 to or from the line of the lower pivots 106 to 109, inclusive, the line of the upper pivots 111 to 114, inclusive, moving with it. Bearing 117 and 118 permit the slide rod 116 to move along the bar 121 in a direction parallel to the line of the pivots. With this arrangement, the two lines of pivots are moved to or from each other without change of parallelism, and, more important, without changing the mutual parallelism of the four velocity compensation arms 101 to 104, inclusive. The amount of motion of the arm 121 is controlled by the length of the lead screw 123. The velocity compensation arms 101 to 104, inclusive, are shown in one extreme position, namely, the "maximum velocity" position. The other extreme position is indicated in dotted line showing a fragment including the upper-right hand end of the movable structure with the first compensation arm 101 at 101', and slide rods bearing 118 at 118'.

The motion of the compensation arms is controlled by means of an auxiliary arm 135 and a link 136. The auxiliary arm 135 is pivotally mounted at both ends similarly to the compensation arms 101 to 104, inclusive. Thus, at the lower end this arm is mounted on a pivot 137 on the base 41 in the line of pivots 106 to 109, inclusive, while at the upper end it is mounted on a pivot 138 on the slide bar 116 in the line of the upper pivots 111 to 114, inclusive. The link 136 is pivotally mounted at its lower end on a pivot 140 which is located at the mid-point of auxiliary arm 135, and at its upper end on a pivot 141 which is fixedly mounted on the outside of the threaded socket 122 in the line of pivots 138 and 111 to 114, inclusive. The two halves of the auxiliary arm 135 and the link 136 have identical lengths, and the angle made by a line from pivot 137 to pivot 141 and a line from pivot 141 to pivot 138 is a right angle. This provides in effect the initial portion of a lazy tongs, so that when pivots 141 and 137 are brought closer together by the lead screw 123, pivot 140 is moved in a direction parallel to the slide bar 116, and, by operating the auxiliary arm 135 as a lever having its fulcrum at the lower pivot 137, moves the slide bar 116 along the raceway 119 in the arm 121. The particular arrangement shown in Fig. 3 provides a linear change in position of the movable arm 21.

The insulated base 42 on which the commutator bars 44 are mounted is disposed under the compensation arms 101 to 104, inclusive. The commutator bars 44 are shown as fine bars very close together in Fig. 3. An enlarged view of these bars and the cooperation of the compensation brushes therewith is shown in Fig. 4. As has been stated, it will be very difficult, if not impossible, to mount brushes in any one of the compensation arms 101 to 104, inclusive, sufficiently close together to provide suitable commutator operation. Instead, considering the brushes in the order from the lowermost or output end of the delay line 45 to the uppermost or input end, the first brush 145 is mounted in the lower end of the right-hand compensation arm 101. The second brush 146 is mounted in the lower end of the next compensation arm 102 but is displaced toward the top or input end of the commutator bar array far enough so that the two adjacent brushes 145 and 146 are separated a distance which is never less than the width of a commutator bar 44, as shown in Fig. 4, and which is slightly greater when the compensation arms are in the uppermost position shown in Fig. 3. The third brush 147 is mounted in the next successive compensation arm 103 and is displaced by a similar amount toward the top of the commutator bar array. The fourth brush 148 is mounted in the lower end of the left-hand compensation arm 104 and is similarly progressively displaced toward the top of the commutator bar array. The fifth brush 149 is mounted in the first compensation arm 101 above the first brush 145 and displaced transversely to the commutator bars 44 by a distance such that it is always separated from the fourth brush 148 by at least the width of a commutator bar 44, when viewed along line 4—4. Referring to Fig. 4, it will be seen that, if we view the delay-line brushes from the line 4—4 in Fig. 3, adjacent brushes will appear to be separated from each other by a distance greater than the width of a commutator bar 44 when the compensation arms 101 to 104, inclusive, are in the extreme position shown in solid lines in Fig. 3, and will appear to be separated from each other by a lesser distance also greater than said width when the compensation arms are in the other extreme position, shown in dotted line in Fig. 3. At no time is more than one commutator bar 44 in a row not contacted by a delay-line brush. Like the hydrophone brushes 60 to 79, inclusive, the diameters of the delay-line brushes 145 to 149, inclusive, are of the same order of magnitude as the width of two commutator bars 44, being in the present instance slightly greater than that width, as shown in Fig. 4. It will be apparent that, with the brush array shown in Fig. 3, a great number of individual brushes which have the electrical effect of being at all times very close to each other can be provided. For example, where the distance across the commutator bars is twenty inches, there may be one thousand or more commutator bars 44 and as many as two hundred and fifty compensation brushes, of which each is in contact at any one time with four or more commutator bars. This provides extremely smooth commutation. Delay-line sections 46 are sequentially connected to the brushes 145 to 149, etc., as shown in Fig. 3. This arrangement is electrically identical to the arrangement shown in Fig. 1.

The position of the compensation arms 101 to 104, inclusive, will depend upon the actual speed of sound through the water. Hence, it is possible to calibrate the compensation system and to provide a calibration indicator. The indicator 128 is intended for this purpose, being simply a numerical counter which indicates the setting of the handwheel 126 that should be employed for a particular speed of sound through the water. It should be apparent that the indicator 128, handwheel 126, lead screw 123, socket 122 and lever arrangement including the link 136 can be employed with the single compensation arm 51 of Fig. 1 for calibrated and/or stabilized operation.

Fig. 5 illustrates in a greatly enlarged view a type of commutator brush which is suitable for use in the system shown. Considering, for example, a brush 52 in the arm 51 of Fig. 1, an electrically conductive socket 151 is mounted in an insulating bushing 152, which in turn is mounted in the arm 51. If the arm 51 is itself an insulator, the bushing 152 can be dispensed with. The upper end of the socket 151 is closed and has a projection 153 to which a wire 154 can be soldered or otherwise fastened. The lower end of the socket 151 is open and is provided with spring fingers 155 which press radially inward. A brush element 156 is provided which has an expanded head 157 at the top. The main body of the brush element 156 is of such a diameter that it fits snugly within the spring fingers 155 while the expanded head is slightly larger, so that, when the brush element is inserted into the socket 151 through the spring fingers, it will not fall out. A coiled spring 158 is located in the socket 151 and urges the brush element 156 outwardly. This spring maintains a slight pressure on the brush element 156, and it is this pressure that keeps this brush element and others like it in contact with the commutator bars 44.

Many variations and modifications of the invention will occur to those skilled in the art. It is therefore intended that the claims that follow shall not be limited by specific details of the herein-described embodiments but only by the prior art.

What is claimed is:

1. In a wave direction determining system, a plurality of individual wave detectors arrayed in a predetermined pattern, a plurality of closely spaced parallel commutator bars disposed in a first plane, a plurality of commutator brushes connected one to each detector and arrayed similarly to said detectors in a second plane parallel to said first plane with said brushes each bearing on said bars, mounting means for said brushes, said mounting means being rotatable about an axis perpendicular to said planes with respect to said bars, a plurality of fixed electrical delay sections, a plurality of electrical coupling means coupling successive delay sections between successive bars, means simultaneously to displace all of said coupling means transversely with respect to said bars in successively increasing amounts from one side of said bars to the other, and indicator means connected to one end of the resulting series of delay sections.

2. In a wave direction determining system, a plurality of individual wave detectors arrayed in a predetermined pattern, a plurality of closely spaced parallel commutator bars disposed in a first plane, a plurality of first commutator brushes connected one to each detector and arrayed similarly to said detectors in a second plane parallel to said first plane with said first brushes each bearing on said bars, mounting means for said first brushes, said mounting means being rotatable about an axis perpendicular to said planes with respect to said bars, a plurality of electrical delay sections, an elongated arm extending across said commutator bars in a direction generally transverse to said bars, a plurality of second commutator brushes mounted in said arm and bearing on said commutator bars, circuit means connecting successive delay sections between successive pairs of said second commutator brushes, means pivotally mounting said arm for motion parallel to said first plane about a pivot point which is fixed with relation to said commutator bars, and indicator means connected to an end one of said delay sections.

3. In a wave direction determining system, a plurality of individual wave detectors arrayed in a predetermined pattern, a plurality of closely spaced parallel commutator bars disposed in a first plane, a plurality of first commutator brushes connected one to each detector and arrayed similarly to said detectors in a second plane parallel to said first plane with said first brushes each bearing on said bars, mounting means for said first brushes, said mounting means being rotatable about an axis perpendicular to said planes with respect to said bars, a plurality of electrical delay sections, an elongated arm extending across said commutator bars in a direction generally transverse to said bars, a plurality of second commutator brushes mounted in said arm and bearing on said commutator bars, circuit means connecting successive delay sections between successive pairs of said second commutator brushes, means pivotally mounting said arm for motion parallel to said first plane about a pivot point which is fixed with relation to said commutator bars, and indicator means connected to an end one of said delay sections, said second brushes being so closely spaced that at no position of said arm is more than one successive bar out of contact with one of said second brushes.

4. In a wave direction determining system, a plurality of individual wave detectors arrayed in a predetermined pattern, a plurality of closely spaced parallel commutator bars disposed in a first plane, a plurality of first commutator brushes connected one to each detector and arrayed similarly to said detectors in a second plane parallel to said first plane with said first brushes each bearing on said bars, mounting means for said first brushes, said mounting means being rotatable about an axis perpendicular to said planes with respect to said bars, a plurality of electrical delay sections, a plurality of parallel arms extending across said bars in a direction generally transverse to said bars, a plurality of second commutator brushes mounted and equally spaced along a line in each of said arms and bearing on said bars, the brushes in successive arms being displaced transversely to said bars with respect to those in the other arms by a distance at least as great as the width of one of said bars, the total displacement from the first arm to the last being uniform, and less than the distance between two adjacent brushes in any one arm, means connecting successive delay sections between pairs of said second brushes successively in the order of their individual displacements transverse to said bars, means pivotally mounting each of said arms for motion parallel to said first plane while maintaining parallelism with each other about individual pivot points which are fixed with relation to said commutator bars, and indicator means connected to an end of the resulting series of delay lines.

5. In a wave direction determining system, a plurality of individual wave detectors arrayed in a predetermined pattern, a plurality of closely spaced parallel commutator bars disposed in a first plane, a plurality of first commutator brushes connected one to each detector and arrayed similarly to said detectors in a second plane parallel to said first plane with said first brushes each bearing on said bars, mounting means for said first brushes, said mounting mean being rotatable about an axis perpendicular to said planes with respect to said bars, a plurality of electrical delay sections, an elongated arm extending across said commutator bars in a direction generally transverse to said bars, a plurality of second commutator brushes mounted in said arm and bearing on said commutator bars, circuit means connecting successive delay sections between successive pairs of said second commutator brushes, means pivotally mounting said arm for motion parallel to said first plane about a pivot point which is fixed with relation to said commutator bars, and indicator means connected to an end one of said delay sections, and means for moving said arm about said pivot point including a lead screw fixedly mounted with respect to said bars, a threaded socket riding on said lead screw, and a link pivotally connected at its ends between said socket and an intermediate point of said arm.

6. An electrical phasing circuit comprising a plurality of adjacent commutator bars, a plurality of electrical delay sections, a commutator brush connected to each of said sections, an elongated arm extending across said bars, means mounting said brushes in said arm to bear on said bars, and means pivotally mounting said arm with respect to said bars.

7. An electrical phasing circuit comprising a plurality of adjacent commutator bars, a plurality of electrical delay sections a commutator brush connected to each of said sections, an elongated arm extending across said bars, means mounting said brushes in said arm to bear on said bars, means pivotally mounting said arm with respect to said bars, a lead screw fixedly mounted with respect to said bars, a threaded socket riding on said lead screw, and a link pivotally connected at its ends between said socket and an intermediate point of said arm.

8. An electrical phasing circuit comprising a plurality of adjacent commutator bars, a plurality of electrical delay sections, a commutator brush connected to each of said sections, an elongated arm extending across said bars, means mounting said brushes in said arm to bear on said bars, means pivotally mounting said arm with respect to said bars, a second arm parallel to the first mentioned arm and pivotally linked at each end to said first-mentioned arm, a lead screw fixedly mounted with respect to said bars, a threaded socket riding on said lead screw, and a link pivotally connected at its ends between said socket and an intermediate point of said second arm.

9. An electrical phasing circuit comprising a plurality of adjacent commutator bars, a plurality of electrical delay sections, a commutator brush connected to each section, a first elongated arm extending across said bars, means mounting said brushes in said first arm to bear on said bars, means pivotally mounting said first arm at a first end at a point fixed with respect to said bars, a second arm parallel to said first arm and pivotally linked at each end to said first arm, the link at said first end being fixed with respect to said bars, and the link at the other end being movable.

10. An electrical phasing circuit comprising a plurality of adjacent commutator bars, a plurality of electrical delay sections, a commutator brush connected to each section, a first elongated arm extending across said bars, means mounting said brushes in said first arm to bear on said bars, means pivotally mounting said first arm at a first end at a fixed point with respect to said bars, a second arm parallel to said first arm and pivotally linked at each end to said first arm, the link at said first end being fixed with respect to said bars, the link at the other end being movable, a lead screw fixedly mounted with respect to said bars, a threaded socket riding on said lead screw, and a third link pivotally connected between said socket and an intermediate point of said second arm.

11. An electrical phasing circuit comprising a plurality of adjacent commutator bars, a plurality of electrical delay sections, a commutator brush connected to each section, a first elongated arm extending across said bars, means mounting said brushes in said first arm to bear on said bars, means pivotally mounting said first arm at a first end at a point fixed with respect to said bars, a second arm parallel to said first arm and pivotally linked at each end to said first arm, the link at said first end being fixed with respect to said bars, the link at the other end being movable, a lead screw fixedly mounted with respect to said bars, a threaded socket riding on said lead screw, and a third link pivotally connected between said socket and an intermediate point of said second arm, an elongated member attached to said socket and extending parallel to said bars, a raceway in said member in the direction of the extension thereof, said movable link being slidably mounted in said raceway.

12. An electrical phasing circuit comprising a plurality of adjacent commutator bars, a plurality of electrical delay sections, a commutator brush connected to each of said sections, an elongated arm extending across said bars, means mounting said brushes in said arm to bear on said bars, means pivotally mounting said arm with respect to said bars, a link pivotally connected at one end to an intermediate point of said arm, and means for moving the other end of said link with respect to the pivot point of said arm.

13. An electrical phasing circuit comprising a plurality of adjacent commutator bars, a plurality of electrical delay sections, a commutator brush connected to each of said sections, an elongated arm extending across said bars, means mounting said brushes in said arm to bear on said bars, means pivotally mounting said arm with respect to said bars, a lead screw fixedly mounted with respect to said bars, a threaded socket riding on said lead screw, and a link pivotally connected at its ends between said socket and an intermediate point of said arm, the lengths of said link and the two parts of said arm being equal, and the two lines from the pivot point of said arm to the free end of said link and from said free end to the free end of said arm forming a right angle.

14. A hydrophone listening system comprising a plurality of hydrophones in an array, a plurality of adjacent commutator bars, a plurality of commutator brushes arranged to connect said hydrophones with said bars, said brushes being arrayed with respect to said bars similarly to said hydrophones, a multisection delay line, a second plurality of commutator brushes for said delay line, connected one to each delay-line section, and means mounting the brushes of said second plurality for contact with said bars, said means extending across said bars, said bars being greater in number than the number of delay-line sections.

15. In a wave direction determining system, a plurality of individual wave detectors arrayed in a predetermined pattern, a plurality of closely spaced parallel commutator bars disposed in a first plane, a plurality of commutator brushes connected one to each detector and arrayed similarly to said detectors in a second plane parallel to said first plane with said brushes each bearing on said bars, mounting means for said brushes, said mounting means being rotatable about an axis perpendicular to said planes with respect to said bars, a plurality of fixed electrical delay sections, a plurality of electrical coupling means coupling successive delay sections between successive bars, said coupling means being arrayed in a path lying generally transverse to said bars, means simultaneously to displace all of said coupling means in successively increasing amounts from one end of said path to the other, whereby to alter the total electrical delay across said bars in increasing amounts from one side thereof to the other, and indicating means connected to one end of the resulting series of delay sections.

16. An electrical phasing circuit comprising a plurality of adjacent commutator bars, a plurality of fixed electrical delay sections, a plurality of electrical coupling means coupling successive delay sections between successive bars, and means simultaneously to displace all of said coupling means transversely with respect to said bars in successively increasing amounts from one of said bars to the other, whereby to alter the electrical delay across said bars in increasing amounts from one side thereof to the other.

References Cited in the file of this patent

UNITED STATES PATENTS

| | | |
|---|---|---|
| 1,977,974 | Rudolph | Oct. 23, 1934 |
| 2,147,657 | Kunze | Feb. 21, 1939 |
| 2,222,006 | Uhing | Nov. 19, 1940 |
| 2,344,431 | Villem | Mar. 14, 1944 |
| 2,378,555 | Jasse | June 19, 1945 |
| 2,406,340 | Batchelder | Aug. 27, 1946 |